United States Patent
Nawata et al.

(10) Patent No.: US 9,944,270 B2
(45) Date of Patent: Apr. 17, 2018

(54) HYBRID VEHICLE

(71) Applicant: Toyota Jidosha Kabushiki Kaisha, Toyota-shi, Aichi-ken (JP)

(72) Inventors: Hidekazu Nawata, Gotemba (JP); Makoto Yamazaki, Gotemba (JP); Yoshikazu Asami, Gotemba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/428,728

(22) Filed: Feb. 9, 2017

(65) Prior Publication Data

US 2017/0232951 A1 Aug. 17, 2017

(30) Foreign Application Priority Data

Feb. 16, 2016 (JP) ................................. 2016-027087

(51) Int. Cl.
*B60W 20/10* (2016.01)
*B60K 6/46* (2007.10)
*B60K 6/54* (2007.10)
*B60W 20/40* (2016.01)

(52) U.S. Cl.
CPC .............. *B60W 20/10* (2013.01); *B60K 6/46* (2013.01); *B60K 6/54* (2013.01); *B60W 20/40* (2013.01)

(58) Field of Classification Search
CPC ............ B60K 6/46; B60K 6/442; B60K 6/54; B60W 20/10; B60W 20/40; B60W 20/15; B60W 20/50
See application file for complete search history.

(56) References Cited

U.S. PATENT DOCUMENTS

| 5,301,764 A * | 4/1994 | Gardner | B60K 6/46 180/65.23 |
|---|---|---|---|
| 5,495,906 A * | 3/1996 | Furutani | B60K 6/442 180/242 |
| 9,738,274 B2 * | 8/2017 | Mitsutani | B60W 20/50 |
| 2004/0135448 A1* | 7/2004 | Matsushita | F16C 19/163 310/90 |
| 2009/0105924 A1* | 4/2009 | Kamichi | B60W 20/15 701/99 |
| 2010/0273604 A1* | 10/2010 | Imaseki | B60K 6/365 477/5 |
| 2012/0095630 A1* | 4/2012 | Muto | B60K 6/46 701/22 |
| 2012/0243426 A1* | 9/2012 | Matsui | H04L 1/1887 370/252 |

(Continued)

FOREIGN PATENT DOCUMENTS

JP 2014231244 A 12/2014

OTHER PUBLICATIONS

U.S. Appl. No. 15/252,762.

*Primary Examiner* — Hau V Phan
(74) *Attorney, Agent, or Firm* — Dinsmore & Shohl LLP

(57) ABSTRACT

An engine ECU executes a control routine including steps of performing output variation control for periodically varying the output of an engine, if control of the engine is not being stopped, at the time of a communication abnormality, and a predetermined time elapses from the time of occurrence of the communication abnormality, and a step of performing fuel-cut control, when the engine speed falls outside a predetermined range.

4 Claims, 9 Drawing Sheets

(56) References Cited

U.S. PATENT DOCUMENTS

| | | | | |
|---|---|---|---|---|
| 2013/0304294 A1* | 11/2013 | Hosoe | ............... | B60W 10/06 |
| | | | | 701/22 |
| 2014/0163796 A1* | 6/2014 | Omi | ................. | B60W 20/50 |
| | | | | 701/22 |
| 2015/0286233 A1* | 10/2015 | Takemoto | ............ | B60L 3/0046 |
| | | | | 700/297 |
| 2016/0325738 A1* | 11/2016 | Miyazaki | ............. | B60L 3/0076 |

* cited by examiner

HYBRID VEHICLE

CROSS-REFERENCE TO RELATED APPLICATIONS

This application claims priority to Japanese Patent Application No. 2016-027087 filed on Feb. 16, 2016, the entire contents of which are hereby incorporated by reference.

BACKGROUND

1. Technical Field

The embodiment relates to control of a hybrid vehicle that uses two or more control units for engine control, and particularly relates to engine stop control when the two or more control units cannot communicate with each other.

2. Description of Related Art

A hybrid vehicle disclosed in Japanese Patent Application Publication No. 2014-231244 (JP 2014-231244 A) includes an engine, a first motor coupled to an output shaft of the engine, and a second motor for driving the vehicle. This hybrid vehicle is equipped with an engine control unit, and an HV (Hybrid Vehicle) control unit. The HV control unit controls the first motor and the second motor, and outputs an engine command signal to the engine control unit via communication with the engine control unit. The engine control unit controls the engine according to the engine command signal received from the HV control unit. When there is an abnormality in communication between the HV control unit and the engine control unit, the HV control unit cuts off a relay for supplying electric power to fuel injection valves of the engine, so as to stop operation of the engine. In this manner, even when an abnormality arises in communication between the HV control unit and the engine control unit, the HV control unit can directly stop the engine, without communicating with the engine control unit.

SUMMARY

If operation of the engine is stopped, when there arises a communication abnormality with which the engine control unit and the HV control unit cannot communicate with each other, the vehicle cannot travel in a limp-home mode, using the power of the engine. Therefore, it is desirable to operate the engine as far as possible even in the event of the communication abnormality.

During operation of the engine at the time of a communication abnormality, it is considered, as fail-safe operation, that the engine control unit performs control for keeping the output of the engine constant, while the HV control unit performs control for keeping the engine speed constant by applying torque of the first motor in a direction opposite to engine torque, to an output shaft of the engine. Also, when the engine is to be stopped during operation, it is considered to cause the HV control unit to stop torque output of the first motor. With the torque output of the first motor thus stopped, restriction of the engine speed by the torque of the first motor is released or eliminated. Therefore, the engine speed increases, and the engine control unit can stop the engine by detecting the increase of the engine speed.

However, friction torque, as well as the engine torque and the torque of the first motor, is applied to the output shaft of the engine. Therefore, if the engine torque and the friction torque are placed in a balanced state, after the torque output of the first motor is stopped, the engine speed may not be increased. As a result, the engine control unit cannot detect increase of the engine speed, and therefore, cannot surely or reliably stop the engine.

The present embodiment provides a hybrid vehicle that permits an engine to operate, and also stops the engine with higher reliability when the engine is required to be stopped, even in the case where two or more control units used for engine control cannot communicate with each other.

A hybrid vehicle according to one aspect of the embodiment includes an engine, a first motor-generator connected to the engine, a second motor-generator coupled to an axle, a first electronic control unit configured to control the engine, and a second electronic control unit configured to control the first motor-generator and the second motor-generator. The second electronic control unit is configured to transmit a command signal regarding activation or stop of the engine, to the first electronic control unit. The first electronic control unit is configured to stop the engine, when an engine speed is outside a predetermined range, during operation of the engine at a time of a communication abnormality. The communication abnormality is a failure to communicate between the first electronic control unit and the second electronic control unit. The second electronic control unit is configured to operate the first motor-generator such that the engine speed is within the predetermined range, during operation of the engine at the time of the communication abnormality. The second electronic control unit is configured to stop torque output of the first motor-generator, when the engine is to be stopped at the time of the communication abnormality. The first electronic control unit is configured to control the engine such that an output of the engine periodically varies, during operation of the engine at the time of the communication abnormality.

With the above arrangement, if the output of the engine is periodically varied, during operation of the engine at the time of the communication abnormality, engine torque can be varied when the engine speed is kept within the predetermined range by the first motor-generator. Therefore, after the torque output of the first motor-generator is stopped, the engine torque and friction torque are less likely or unlikely to be held in a balanced state. Since the varying engine torque exceeds or falls below the friction torque, the engine speed can be changed to be outside the predetermined range. As a result, the engine can be stopped with higher reliability.

In the hybrid vehicle according to the above aspect of the embodiment, the first electronic control unit may be configured to control the engine by periodically varying a throttle opening of the engine, at the time of the communication abnormality, such that the output of the engine is periodically varied.

By periodically varying the throttle opening so as to periodically vary the output of the engine, during operation of the engine at the time of the communication abnormality, it is possible to vary the engine torque, when the engine speed is kept in the predetermined range by the first motor-generator. Therefore, after the torque output of the first motor-generator is stopped, the engine torque and the friction torque are less likely or unlikely to be held in a balanced state. Since the varying engine torque exceeds or falls below the friction torque, the engine speed can be changed to be outside the predetermined range. As a result, the engine can be stopped with higher reliability. Furthermore, the engine can be kept operating, so that electric power can be kept generated using the first motor-generator.

In the hybrid vehicle according to the above aspect of the embodiment, the first electronic control unit may be configured to control the engine by periodically executing fuel-cut control while the engine is rotating, at the time of the communication abnormality, such that the output of the engine is periodically varied.

By periodically executing the fuel-cut control, during rotation of the engine at the time of the communication abnormality, the execution period and non-execution period of the fuel-cut control are repeated, so that the engine torque can be varied. Therefore, after the torque output of the first motor-generator is stopped, the engine torque and the friction torque are less likely or unlikely to be held in a balanced state. Since the engine torque is reduced to be smaller than the friction torque during fuel-cut control, the engine speed can be changed to be outside the predetermined range. As a result, the engine can be stopped with higher reliability. Furthermore, a period in which fuel injection is stopped under fuel-cut control is set; therefore, the amount of fuel consumption is less likely or unlikely to be increased.

The hybrid vehicle may include a planetary gear mechanism configured to mechanically couple the engine, the first motor-generator, and the second motor-generator.

With the above arrangement, in the hybrid vehicle installed with the planetary gear mechanism that mechanically couples the first motor-generator, second motor-generator, and the engine, even when two or more control units used for engine control cannot communicate with each other, the engine is able to operate, and the engine can be stopped with higher reliability when the engine is required to be stopped.

According to the embodiment, it is possible to provide the hybrid vehicle in which the engine is able to operate, and the engine can be stopped with higher reliability when the engine is required to be stopped, even in the case where two or more control units used for engine control cannot communicate with each other.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
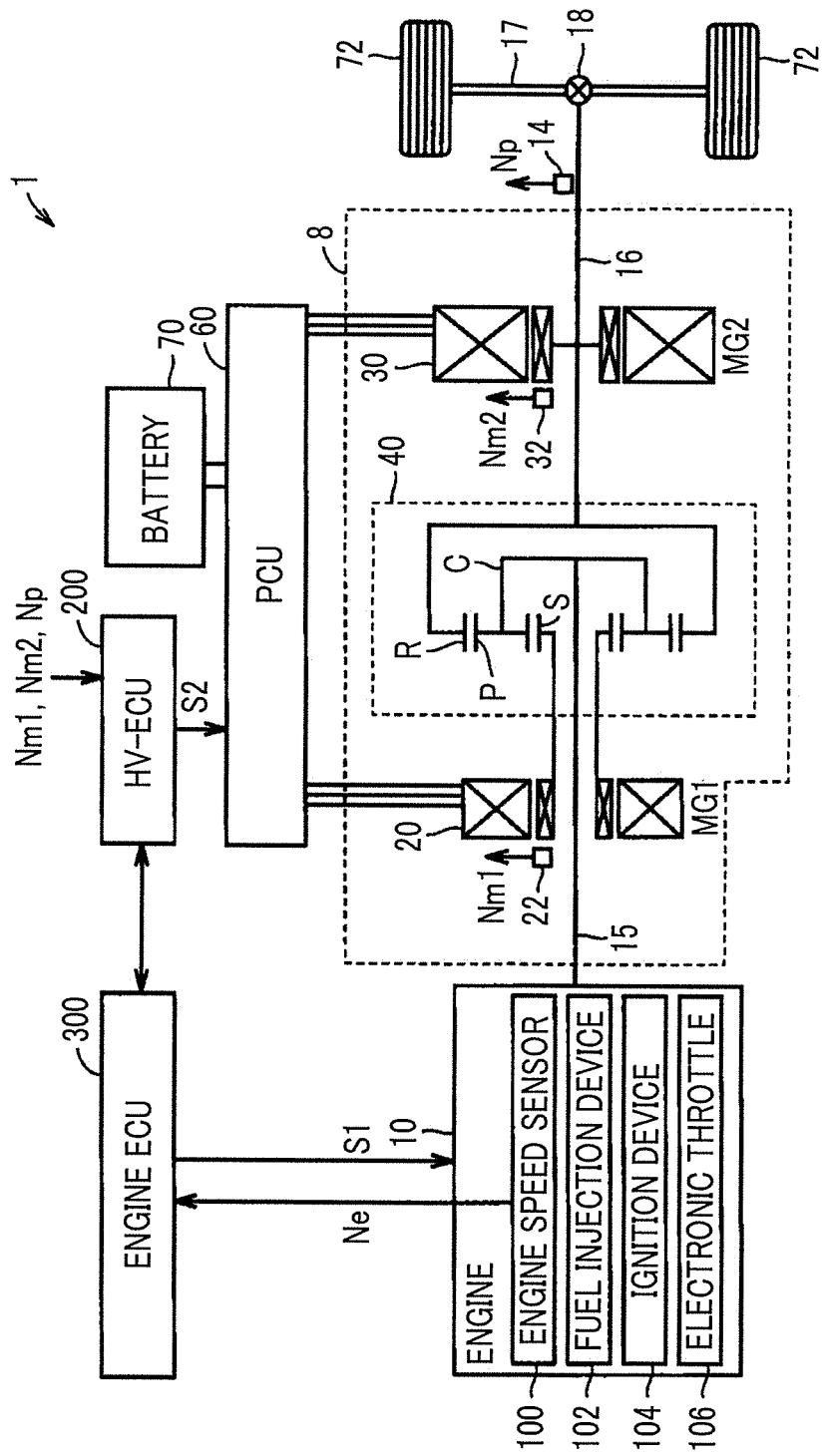
FIG. 1 is a schematic view showing the configuration of a hybrid vehicle according to a first embodiment.

Some embodiments will be described in detail with reference to the drawings. In the drawings, the same reference numerals are assigned to the same or corresponding portions or components, of which explanation will not be repeated in principle.

A first embodiment will be described. Referring to an overall block diagram of FIG. 1, a hybrid vehicle 1 (which will be simply referred to as "vehicle 1") will be described. The vehicle 1 includes a transaxle 8, engine 10, drive shaft 17, differential gear 18, PCU (Power Control Unit) 60, battery 70, drive wheels 72, HV-ECU (Electronic Control Unit) 200, and an engine ECU 300.

The engine 10 is an internal combustion engine, such as a gasoline engine or a diesel engine, and is controlled based on a control signal S1 from the engine ECU 300. The engine 10 includes an engine speed sensor 100, fuel injection devices 102, ignition devices 104, and an electronic throttle 106.

The engine speed sensor 100 detects the rotational speed of the engine 10 (which will be referred to as "engine speed") Ne. The engine speed sensor 100 transmits a signal indicating the detected engine speed Ne, to the engine ECU 300. The engine speed sensor 100 is provided at a position opposed to a crankshaft (output shaft) of the engine 10, for example.

In this embodiment, the engine 10 includes a plurality of cylinders (not shown). The fuel injection device 102 is provided in an intake port of each cylinder. Also, the ignition device 104 is provided at the top of each cylinder. The fuel injection device 102 may also be provided within each cylinder. The electronic throttle 106 is provided at a certain point in an intake passage (not shown), and includes a throttle valve (not shown) for adjusting the flow rate of air in the intake passage, and a throttle motor (not shown) for adjusting the opening of the throttle valve (which will be referred to as "throttle opening" in the following description).

With the engine 10 constructed as described above, the engine ECU 300 controls the amount of fuel injected into each of the cylinders, by injecting an appropriate amount of fuel into each of the cylinders at an appropriate point in time, or stopping injection of the fuel into the cylinders. Further, the engine ECU 300 adjusts the throttle opening of the electronic throttle 106, and performs ignition control using the ignition devices 104.

The transaxle 8 includes an input shaft 15, output shaft 16, first motor-generator (which will be denoted as "first MG") 20, second motor-generator (which will be denoted as "second MG") 30, and a power split device 40. The input shaft 15 of the transaxle 8 is connected to the crankshaft of the engine 10. The output shaft 16 of the transaxle 8 is connected to the drive wheels 72 via the differential gear 18 and the drive shaft 17.

The first MG 20 and the second MG 30 are three-phase AC rotating electric machines, for example. The first MG 20 and the second MG 30 are driven by the PCU 60.

The first MG 20 functions as a generator (power generating unit) that generates electric power, using power of the engine 10 split by the power split device 40. The electric power generated by the first MG 20 is supplied to the battery 70 via the PCU 60. Also, the first MG 20 receives electric power from the battery 70, and rotates the crankshaft as the output shaft of the engine 10. Thus, the first MG 20 functions as a starter for starting the engine 10.

The first MG 20 is provided with an MG1 speed sensor 22. The MG1 speed sensor 22 detects the rotational speed Nm1 of a rotary shaft of the first MG 20. The MG1 speed sensor 22 transmits a signal indicating the detected rotational speed Nm1 of the first MG 20 to the HV-ECU 200.

The second MG 30 functions as a driving motor that applies driving force to the drive wheels 72, using at least one of electric power stored in the battery 70 and electric power generated by the first MG 20. Also, the second MG 30 functions as a generator that generates electric power through regenerative braking. The electric power generated by the second MG 30 is supplied to the battery 70 via the PCU 60.

The second MG 30 is provided with an MG2 speed sensor 32. The MG2 speed sensor 32 detects the rotational speed Nm2 of a rotary shaft of the second MG 30. The MG2 speed sensor 32 transmits a signal indicating the detected rotational speed Nm2 of the second MG 30 to the HV-ECU 200.

The power split device 40 is arranged to be able to split power generated by the engine 10, to a path that leads to the drive shaft 17 via the output shaft 16, and a path that leads to the first MG 20. The power split device 40 is a planetary gear mechanism including a sun gear S, carrier C, ring gear R, and pinion gears P, for example. The sun gear S is coupled to a rotor of the first MG 20. The ring gear R is coupled to a rotor of the second MG 30. The pinion gears P mesh with the sun gear S and the ring gear R. The carrier C holds the pinion gears P such that the pinion gears P can rotate about themselves and rotate about the axis of the power split device 40. The carrier C is coupled to the input shaft 15. Thus, the engine 10, first MG 20, and the second MG 30 are mechanically connected by the power split device 40.

The vehicle 1 constructed as described above travels with driving force or power generated from at least one of the engine 10 and the second MG 30.

The PCU 60 converts DC power supplied from the battery 70, into AC power, and drives the first MG 20 and the second MG 30 with the AC power. Also, the PCU 60 converts AC power generated by the first MG 20 and the second MG 30, into DC power, and charges the battery 70 with the DC power. For example, the PCU 60 includes an inverter (not shown) that performs DC/AC power conversion, and a converter (not shown) that performs DC voltage conversion between the DC link side of the inverter and the battery 70.

The battery 70 is a rechargeable DC power supply. For example, a secondary battery, such as a nickel-hydrogen battery or a lithium-ion battery, is used as the battery 70. The battery 70 may be charged with electric power generated by the first MG 20 and/or the second MG 30 as described above, and may also be charged with electric power supplied from an external power supply (not shown). The battery 70 is not limited to the secondary battery, but may be any rechargeable power storage device that can produce DC voltage. For example, the battery 70 may be a capacitor.

The HV-ECU 200 estimates the remaining capacity (which will be referred to as SOC (State of Charge)) of the battery 70, based on the current, voltage, and battery temperature of the battery 70, for example.

An output shaft speed sensor 14 detects the rotational speed Np of the output shaft 16. The output shaft speed sensor 14 transmits a signal indicating the detected rotational speed Np, to the HV-ECU 200. The HV-ECU 200 calculates the vehicle speed V based on the rotational speed Np thus received. The HV-ECU 200 may also calculate the vehicle speed V, based on the rotational speed Nm2 of the second MG 30, in place of the rotational speed Np.

The HV-ECU 200 monitors conditions of the first MG 20 and the second MG 30, based on detection results of the MG1 speed sensor 22 and the MG2 speed sensor 32. Further, the HV-ECU 200 produces a control signal for controlling the PCU 60, and outputs the produced control signal S2 to the PCU 60. The HV-ECU 200 controls the PCU 60, thereby to control the output of the first MG 20 and the second MG 30 (the amount of current flowing through the first MG 20 and the second MG 30).

The engine ECU 300 is configured to be able to communicate with the HV-ECU 200 via a communication bus in a certain communication method. The engine ECU 300 monitors conditions of the engine 10 based on detection results of the engine speed sensor 100. Further, the engine ECU 300 produces a control signal S1 for controlling the engine 10, based on a command signal from the HV-ECU 200, and outputs the produced control signal S1 to the engine 10.

More specifically, the engine ECU 300 receives the engine speed Ne from the engine speed sensor 100, and outputs its value to the HV-ECU 200. Also, the engine ECU 300 controls the fuel injection, ignition timing, throttle opening, valve timing, etc. of the engine 10, so that the engine 10 is driven at an operating point that is determined based on required engine power determined by the HV-ECU 200.

The HV-ECU 200 controls operation of the first MG 20 and operation of the second MG 30 via the PCU 60. Further, the HV-ECU 200 communicates with the engine ECU 300, and controls the engine 10 via the engine ECU 300. In this manner, the HV-ECU 200 comprehensively controls the vehicle 1 as a whole.

For example, the case where the vehicle 1 travels in a condition where the engine 10 is stopped (namely, the vehicle 1 travels in an EV mode) is assumed. In this case, when a starting condition of the engine 10, such as a condition that the SOC of the battery 70 is reduced to be lower than a threshold value, is satisfied, the HV-ECU 200 and the engine ECU 300 cooperate with each other to start the engine 10.

More specifically, when a starting condition of the engine 10 is satisfied, the HV-ECU 200 transmits a command signal indicating a request for start of the engine 10, to the engine ECU 300. Further, the HV-ECU 200 uses the first MG 20 for cranking of the engine 10. The engine ECU 300 executes ignition control using the ignition devices 104, and fuel injection control using the fuel injection devices 102, at the time when the engine speed Ne becomes equal to or higher than a rotational speed that permits the initial combustion, in response to the request for start from the HV-ECU 200. The HV-ECU 200 finishes cranking using the first MG 20, after determining that the engine 10 has started, based on the engine speed Ne.

Each of the HV-ECU 200 and the engine ECU 300 includes a CPU (Central Processing Unit), memory, input/output buffer, etc. (none of which is not shown in the drawings). Various controls performed by the HV-ECU 200 or the engine ECU 300 are not limited to processing by software, but any of the controls may be implemented by a dedicated hardware (electronic circuit)

In the vehicle 1 constructed as described above, a communication abnormality may occur such that the engine ECU 300 and the HV-ECU 200 cannot communication with each other. In this case, the vehicle 1 is arranged to travel in a limp-home mode, so that the vehicle 1 keeps traveling. During limp-home traveling of the vehicle 1, the engine 10 is switched from normal operation to fail-safe operation. As the fail-safe operation, it may be considered to stop the engine 10, for example. However, if the engine 10 is stopped, the vehicle 1 cannot travel in the limp-home mode, using the power of the engine 10, thus making it difficult to ensure a sufficient traveling distance. Therefore, it is desirable to perform fail-safe operation in which the engine is operated as long as it can even at the time of a communication abnormality.

One example of fail-safe operation of the engine 10 at the time of a communication abnormality will be described. During operation of the engine 10 at the time of a communication abnormality, it is considered, as fail-safe operation, that the engine ECU 300 performs control for keeping the output of the engine 10 constant, and the HV-ECU 200 performs control for keeping the engine speed Ne constant by applying torque of the first MG 20 in a direction opposite to that of engine torque, to the output shaft of the engine 10.

More specifically, the engine ECU 300 controls the engine 10 so that the output of the engine 10 is kept at a predetermined value (this control will also be referred to as "constant output control").

The HV-ECU 200 controls the first MG 20 so that the engine speed Ne is kept at a target rotational speed Net (this control will also be referred to as "constant Ne control").

Also, the HV-ECU 200 controls the second MG 30 so as to satisfy required driving force based on the accelerator pedal position, etc. It is thus possible to generate electric power in the first MG 20, using a part of the power of the engine 10, and also transmit the remaining part of the power of the engine 10, to the drive wheels 72, along with the power of the second MG 30, so as to travel the vehicle 1.

Figure 2:
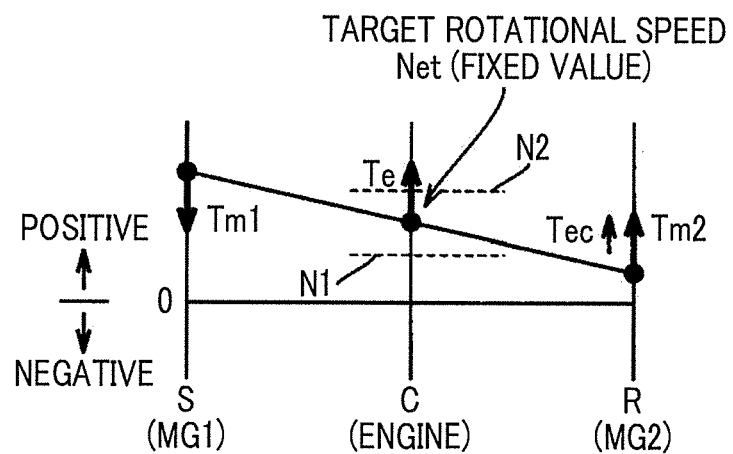
FIG. 2 is a nomographic chart indicating changes in rotational speeds of respective rotational elements of a power split device during operation of an engine, at the time of a communication abnormality.

The operation of the engine 10 during fail-safe operation will be described. FIG. 2 is a nomographic chart showing changes in the rotational speeds of respective rotating elements of the power split device 40 during operation of the engine 10. With the engine 10, first MG 20, and the second MG 30 mechanically coupled by the power split device 40, the rotational speed of the first MG 20 (the rotational speed of the sun gear S), the engine speed Ne (the rotational speed of the carrier C), and the rotational speed of the second MG 30 (the rotational speed of the ring gear R) have such a relationship that these speeds are connected by a straight line on the nomographic chart of the power split device 40 (if any two of the rotational speeds are determined, the remaining rotational speed is determined), as shown in FIG. 2.

Accordingly, as shown in FIG. 2, in the case where the vehicle 1 travels at a constant vehicle speed (where the rotational speed of the second MG 30 is constant), for example, torque Tm1 of the first MG 20 is applied in a negative direction to the sun gear S, so as to restrict the engine speed Ne and keep it at a target rotational speed Net. In the first MG 20, electric power is generated, since it produces torque in the negative direction while rotating in the positive direction.

Also, the engine speed Ne is kept at the target rotational speed Net, while the output of the engine 10 is kept constant, at the predetermined value, so that engine torque Te is applied in the positive direction to the carrier C. Therefore, with the negative torque Tm1 of the first MG 20 applied to the sun gear S, and the positive engine torque Te applied to the carrier C, directly reached torque Tec of the engine 10 is applied to the ring gear R. The directly reached torque Tec applied to the ring gear R and the torque Tm2 of the second MG 30 are transmitted to the drive wheels 72.

A request for stop of the engine, which is generated by the HV-ECU 200 during fail-safe operation, will be described.

Figure 3:
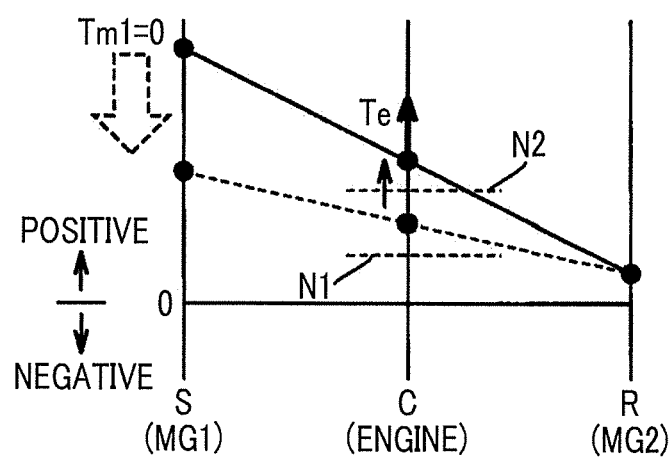
FIG. 3 is a nomographic chart indicating changes in rotational speeds of respective rotational elements of a power split device when torque output of a first MG is stopped.

When the engine 10 is to be stopped during operation at the time of a communication abnormality, the HV-ECU 200 stops torque output of the first MG 20. FIG. 3 is a nomographic chart indicating changes in the rotational speeds of respective rotating elements of the power split device 40 in the case where the torque output of the first MG 20 is stopped. As shown in FIG. 3, if the torque output of the first MG 20 is stopped, restriction of the engine speed Ne by the torque of the first MG 20 is released or eliminated. Therefore, the engine speed Ne increases due to the engine torque Te. The engine ECU 300 stops the engine 10 when detecting the increase of the engine speed. Namely, the HV-ECU 200 indirectly transmits a request for stop of the engine 10 to the engine ECU 300, by increasing the engine speed.

When the engine speed Ne gets out of a predetermined range from a lower-limit value N1 to an upper-limit value N2, from within the predetermined range, for example, the engine ECU 300 performs fuel-cut control, and stops fuel injection.

The lower-limit value N1 of the predetermined range is set to the engine speed Ne at which the engine 10 can keep operating. For example, the lower-limit value N1 may be obtained by subtracting a predetermined value a from the target rotational speed Net. The lower-limit value N1 is, for example, a rotational speed around 1000 rpm.

The upper-limit value N2 of the predetermined range is a value larger than the lower-limit value N1, and is set so that the amount of electric power generated during operation of the engine 10 does not become excessively large. For example, the upper-limit value N2 may be obtained by adding a predetermined value a to the target rotational speed Net. The upper-limit value N2 is, for example, a rotational speed around 2000 rpm.

The lower-limit value N1 and the upper-limit value N2 may also be set according to conditions (e.g., the water temperature) of the engine 10 or conditions (e.g., the SOC and the battery temperature) of the battery 70, for example.

Figure 4:
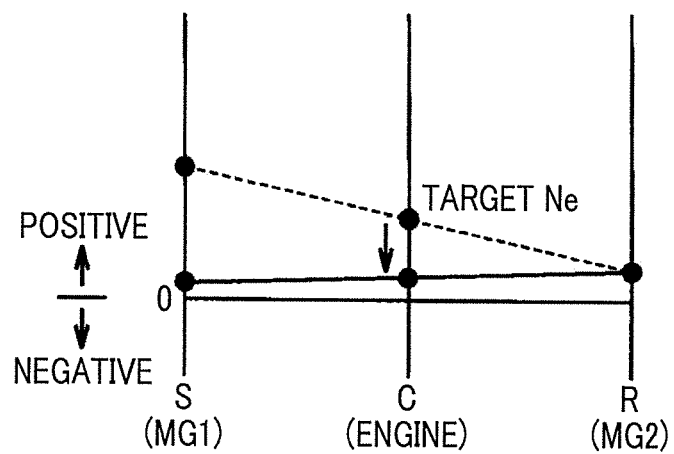
FIG. 4 is a nomographic chart indicating changes in rotational speeds of respective rotational elements of a power split device when fuel-cut control is performed.

Stop of the engine 10 during fail-safe operation will be described. FIG. 4 is a nomographic chart showing changes in the rotational speeds of respective rotating elements of the power split device 40 when the fuel-cut control is performed. As shown in FIG. 4, since no engine torque is generated if fuel injection is stopped, the engine speed Ne is reduced due to friction torque of the engine 10.

Each of the HV-ECU 200 and the engine ECU 300 determines that the engine 10 has stopped, when the engine speed Ne is reduced to be equal to or lower than a threshold value (e.g., zero). In this connection, the HV-ECU 200 calculates the engine speed Ne, based on the rotational speed Nm1 of the first MG 20, the rotational speed Nm2 of the second MG 30, and the gear ratio of the power split device 40. The engine ECU 300 detects the engine speed Ne by means of the engine speed sensor 100.

However, friction torque of the engine 10, as well as engine torque and torque of the first MG 20, is applied to the output shaft of the engine 10. Therefore, if the engine torque and the friction torque are brought into a condition where they are balanced with each other, after the torque output of the first MG 20 is stopped, the engine speed Ne may not increase. As a result, the engine ECU 300 may not be able to surely stop the engine 10 since it cannot detect increase of the engine speed Ne.

Thus, in this embodiment, during operation of the engine 10 at the time of a communication abnormality, the engine ECU 300 controls the engine 10 such that the output of the engine 10 varies periodically. More specifically, the engine ECU 300 controls the engine 10 by periodically varying the throttle opening, so as to periodically vary the output of the engine 10 (this control will be referred to as "output variation control").

In the above manner, the engine torque can be varied during operation of the engine at the time of a communication abnormality. Therefore, after the torque output of the first MG 20 is stopped, the engine torque and the friction torque are less likely or unlikely to be kept in a balanced state. Therefore, the engine speed Ne can be changed to be outside the predetermined range. As a result, the engine 10 can be stopped with higher reliability.

Figure 5:
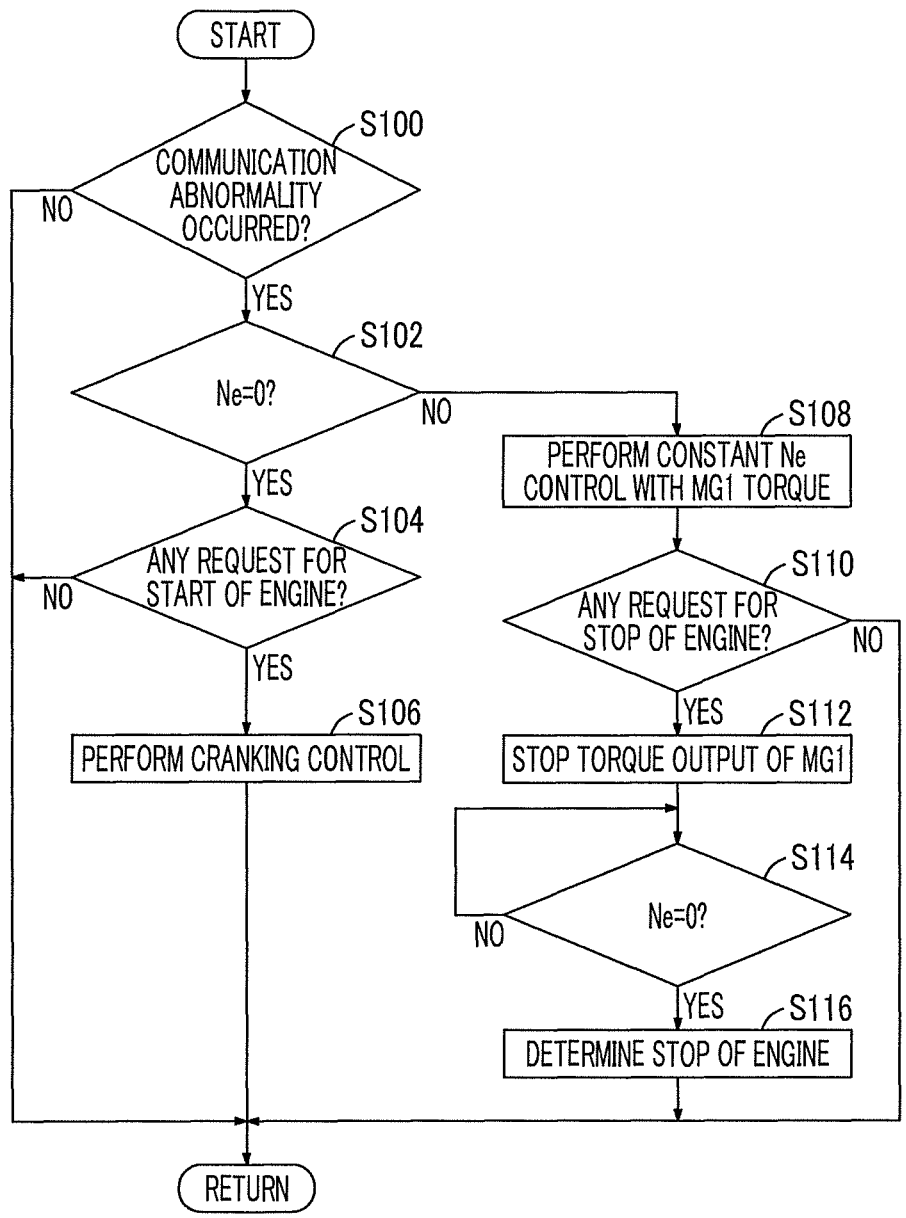
FIG. 5 is a flowchart illustrating a control routine executed by an HV-ECU in the first embodiment.

Referring to FIG. 5, a control routine executed by the HV-ECU 200 installed on the vehicle 1 according to this embodiment will be described.

In step S100, the HV-ECU 200 determines whether there is a communication abnormality. If the HV-ECU 200 is continuously unable to receive information from the engine ECU 300 for a given period of time, for example, the HV-ECU 200 determines that there is a communication abnormality. In another example, the HV-ECU 200 transmits a command signal that causes the engine ECU 300 to generate a response signal, to the engine ECU 300, and determines that there is a communication abnormality if the HV-ECU 200 does not receive the response signal from the engine ECU 300 until a predetermined time elapses, for example. If it is determined that there is a communication abnormality (YES in step S100), the control proceeds to step S102.

In step S102, the HV-ECU 200 determines whether the engine speed Ne is equal to zero. As described above, the HV-ECU 200 calculates the engine speed Ne, based on the rotational speed Nm1 of the first MG 20, the rotational speed Nm2 of the second MG 30, and the gear ratio of the power split device 40. If it is determined that the engine speed Ne is equal to zero (YES in step S102), the control proceeds to step S104.

In step S104, the HV-ECU 200 determines whether there is a request for start of the engine 10. As described above, when a starting condition of the engine 10 is satisfied, for example, the HV-ECU 200 determines that there is a request for start of the engine 10. If it is determined that there is a request for start of the engine 10 (YES in step S104), the control proceeds to step S106.

In step S106, the HV-ECU 200 performs cranking control using the first MG 20. The HV-ECU 200 increases the rotational speed Nm1 of the first MG 20, so that the engine speed Ne rises to be within a rotational speed range in which the engine 10 can be started. The HV-ECU 200 finishes the cranking control when start-up of the engine 10 is completed. The HV-ECU 200 determines that start-up of the engine 10 is completed, when the MG1 torque necessary to keep the engine speed Ne within the startable rotational speed range is reduced to be equal to or smaller than a given value, for example.

If it is determined that there is no communication abnormality (NO in step S100), or if it is determined that there is no request for start of the engine 10 (NO in step S104), the HV-ECU 200 finishes this routine.

On the other hand, if it is determined that there is a communication abnormality (YES in step S100), and it is determined that the engine speed Ne is not equal to zero (NO in step S102), namely, when the engine 10 is in operation, the HV-ECU 200 proceeds to step S108.

In step S108, the HV-ECU 200 performs constant Ne control. In the constant Ne control, the HV-ECU 200 performs feedback control on the output torque of the first MG 20 so that the engine speed Ne is kept at the target rotational speed Net.

In step S110, the HV-ECU 200 determines whether there is a request for stop of the engine 10. More specifically, the HV-ECU 200 determines that there is a request for stop of engine 10 when a condition for stopping the engine 10 is satisfied. The condition for stopping the engine 10 is a condition for stopping charging of the battery 70, and includes a condition that the battery 70 is in a fully charged state in which the SOC is larger than a threshold value, etc. for example. If it is determined that there is a request for stop of the engine 10 (YES in step S110), the control proceeds to step S112.

In step S112, the HV-ECU 200 stops torque output of the first MG 20, so as to finish the constant Ne control. The HV-ECU 200 stops torque output of the first MG 20, by setting the torque command value of the first MG 20 to zero.

In step S114, the HV-ECU 200 determines whether the engine speed Ne is equal to zero. If it is determined that the engine speed Ne is equal to zero (YES in step S114), the control proceeds to step S116.

In step S116, the HV-ECU 200 determines that the engine 10 has stopped. If there is no request for stop of the engine in step S110, this routine ends. Also, if it is determined in step S114 that the engine speed Ne is not equal to zero (NO in step S114), the control returns to step S114, and waits until it is determined that the engine speed Ne is equal to zero.

Figure 6:
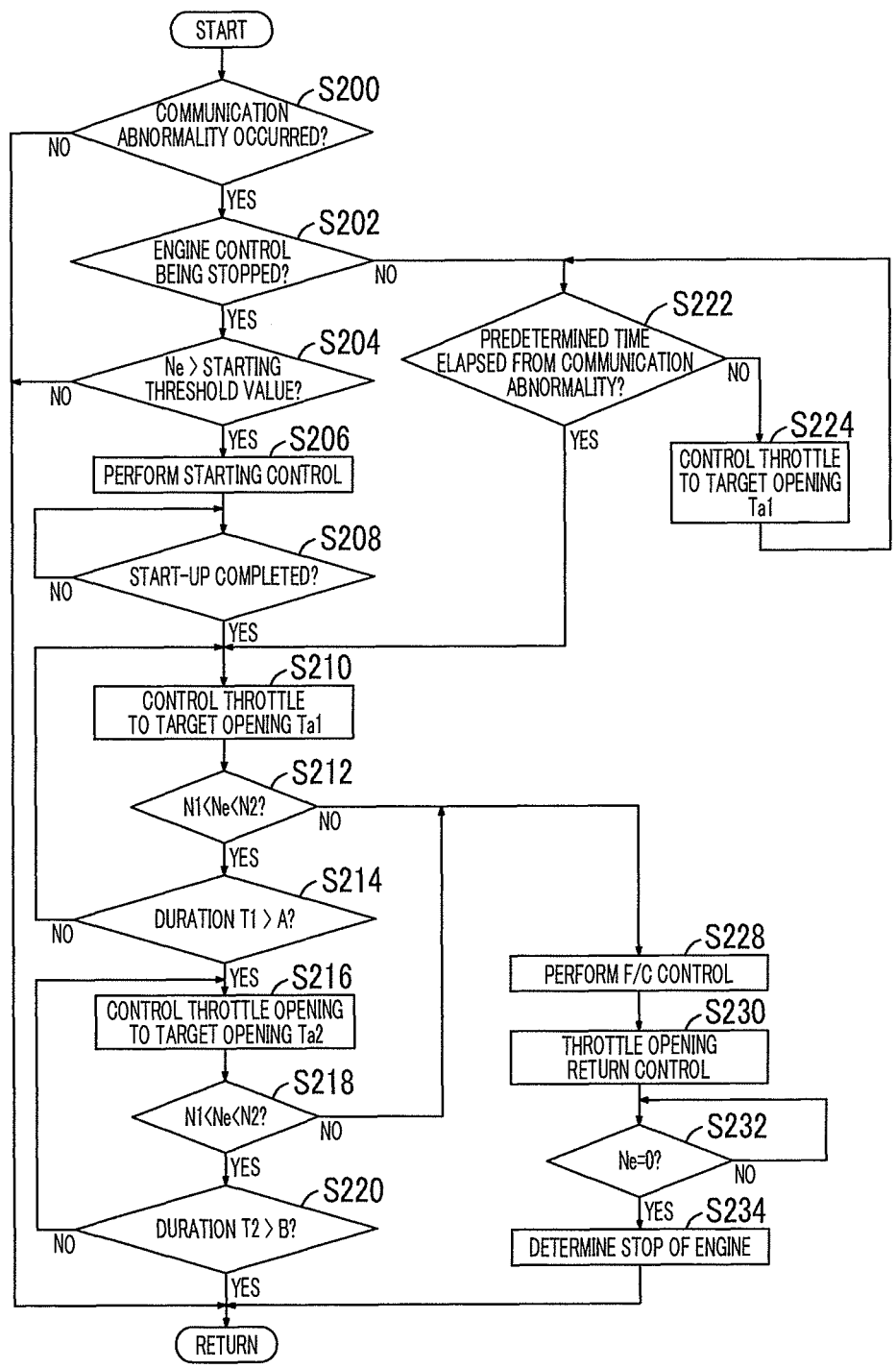
FIG. 6 is a flowchart illustrating a control routine executed by an engine ECU in the first embodiment.

Referring next to FIG. 6, a control routine executed by the engine ECU 300 installed on the vehicle 1 according to this embodiment will be described.

In step S200, the engine ECU 300 determines whether there is a communication abnormality. If the engine ECU 300 is continuously unable to receive information from the HV-ECU 200 for a given period of time, for example, the engine ECU 300 determines that there is a communication abnormality. In another example, the engine ECU 300 transmits a command signal that causes the fly-ECU 200 to generate a response signal, to the HV-ECU 200, for example, and determines that there is a communication abnormality when the engine ECU 300 does not receive the response signal from the HV-ECU 200 until a predetermined time elapses. If it is determined that there is a communication abnormality (YES in step S200), the control proceeds to step S202.

In step S202, the engine ECU 300 determines whether control of the engine 10 is being stopped. When neither the fuel injection control nor the ignition control is performed, for example, the engine ECU 300 determines that control of the engine 10 is being stopped. The engine ECU 300 may determine whether control of the engine 10 is being stopped, based on a state of a flag that is set to ON when the above-described control is executed, for example. If it is determined that control of the engine 10 is being stopped (YES in step S202), the control proceeds to step S204.

In step S204, the engine ECU 300 determines whether the engine speed Ne is higher than a starting threshold value Ne(0). The starting threshold value Ne(0) is a rotational speed at which the engine 10 can be started, and may be a predetermined value, or a value set according to conditions (e.g., the water temperature) of the engine 10. If it is determined that the engine speed Ne is higher than the starting threshold value Ne(0) (YES in step S204), the control proceeds to step S206.

In step S206, the engine ECU 300 performs starting control. More specifically, the engine ECU 300 performs fuel injection control and ignition control. In step S208, the engine ECU 300 determines whether start-up of the engine 10 is completed. When the engine speed Ne is within a predetermined range from the lower-limit value N1 to the upper-limit value N2, the engine ECU 300 determines that start-up of the engine 10 is completed. If it is determined that start-up of the engine 10 is completed (YES in step S208), the control proceeds to step S210.

In step S210, the engine ECU 300 controls the electronic throttle 106 of the engine 10 so that the throttle opening becomes equal to a target opening Ta1. Since the negative torque of the first MG 20 increases as the engine torque increases, the target opening Ta1 is set so that at least the amount of electric power generated does not become excessively large. The target opening Ta1 may be a predetermined value, or may be a value that is set based on conditions (e.g., the SOC and the battery temperature) of the battery 70.

At this time, the engine ECU 300 calculates the required fuel injection amount (fuel injection time) from the intake air amount detected by an air flow meter (not shown), and a target value of the air-fuel ratio (e.g., the stoichiometric air-fuel ratio). The engine ECU 300 controls the fuel injection device 102, based on the calculated fuel injection amount.

In step S212, the engine ECU 300 determines whether the engine speed Ne is within the predetermined range from the lower-limit value N1 to the upper-limit value N2. If it is determined that the engine speed Ne is within the predetermined range (YES in step S212), the control proceeds to step S214.

In step S214, the engine ECU 300 determines whether a value indicating a duration T1 is larger than a threshold value A. The duration T1 is an elapsed time from a point in time at which control of the electronic throttle 106 was started so as to make the throttle opening equal to the target opening Ta1. For example, the threshold value A may be a predetermined value, or may be a value set based on conditions of the engine 10, etc. If it is determined that the value indicating the duration T1 is larger than the threshold value A (YES in step S214), the control proceeds to step S216.

In step S216, the engine ECU 300 controls the electronic throttle 106 of the engine 10 so that the throttle opening becomes equal to a target opening Ta2. The target opening Ta2 is set so that it is larger than at least the target opening Ta1, and the amount of electric power generated does not become excessively large. The target opening Ta2 may be a predetermined value, or may be a value set based on conditions of the battery 70.

In step S218, the engine ECU 300 determines whether the engine speed Ne is within the predetermined range from the lower-limit value N1 to the upper-limit value N2. If it is determined that the engine speed Ne is within the predetermined range (YES in step S218), the control proceeds to step S220.

In step S220, the engine ECU 300 determines whether a value indicating a duration T2 is larger than a threshold value B. The duration T2 is an elapsed time from a point in time at which control of the electronic throttle 106 was started so as to make the throttle opening equal to the target opening Ta2. For example, the threshold value B may be a predetermined value, or a value set based on conditions of the engine 10, etc. If it is determined that the value indicating the duration T2 is larger than the threshold value B (YES in step S220), the control routine ends.

If the value indicating the duration T1 is equal to or smaller than the threshold value A (NO in step S214), the engine ECU 300 returns to step S210. Also, if the value indicating the duration T2 is equal to or smaller than the threshold value B (NO in step S220), the engine ECU 300 returns to step S216. Further, if the engine ECU 300 determines that the engine speed Ne is not within the predetermined range, in step S212 or step S218 (NO in step S212 or NO in step S218), the engine ECU 300 proceeds to step S228. The operation of steps S210, S214, S216 and S220 of FIG. 6 corresponds to output variation control according to this embodiment.

In step S228, the engine ECU 300 executes fuel-cut control since the engine speed Ne falls outside the predetermined range.

In step S230, the engine ECU 300 executes throttle opening return control since the engine 10 is stopped, thus making it unnecessary to actuate the electronic throttle 106.

In step S232, the engine ECU 300 determines whether the engine speed Ne is equal to zero. If it is determined that the engine speed Ne is equal to zero (YES in step S232), the engine ECU 300 determines in step S234 that the engine 10 has been stopped. If it is determined that the engine speed Ne is not equal to zero (NO in step S232), the engine ECU 300 returns to step S232, and waits until the engine speed Ne becomes equal to zero.

If there is no communication abnormality (NO in step S200), or if the engine speed Ne is equal to or lower than the starting threshold value Ne(0) (NO in step S204) while the engine control is being stopped (YES in step S202), the engine ECU 300 finishes the routine. Also, if it is determined that start-up of the engine 10 has not been completed (NO in step S208), the engine ECU 300 returns to step S208, and waits until start-up of the engine 10 is completed.

If it is determined that there is a communication abnormality (YES in step S200), and it is determined that engine control is not being stopped (NO in step S202), the engine ECU 300 determines in step S222 whether a predetermined time has elapsed from a point in time at which the communication abnormality occurred. The predetermined time is longer than a length of time it takes from the time when the above-described constant Ne control was started by the HV-ECU 200, at the time when the communication abnormality occurred, to a point in time at which the engine speed Ne is expected to be within the predetermined range. If it is determined that the predetermined time has elapsed from the time when the communication abnormality occurred (YES in step S222), the control proceeds to step S210. If it is determined that the predetermined time has not elapsed from the time when the communication abnormality occurred (NO in step S222), the control proceeds to step S224.

In step S224, the engine ECU 300 controls the electronic throttle 106 of the engine 10 so that the throttle opening becomes equal to the target opening Ta1, and proceeds to step S222.

The operation of the HV-ECU 200 and the engine ECU 300 of the vehicle 1 of this embodiment constructed as described above, based on the above flowcharts, will be described with reference to FIG. 7.

For example, the case where the engine 10 is in operation, and there is an abnormality in bidirectional communication between the HV-ECU 200 and the engine ECU 300 is assumed.

In this case, since there is a communication abnormality (YES in step S100), and the engine speed Ne is not equal to zero (NO in step S102), the HV-ECU 200 performs constant Ne control (step S108). Therefore, as indicated by line LN2 of FIG. 7, the engine speed Ne is controlled so as to be constantly kept equal to the target rotational speed Net.

On the other hand, since there is a communication abnormality (YES in step S200), and engine control is not being stopped (NO in step S202), the engine ECU 300 determines whether the predetermined time has elapsed from the time when the communication abnormality occurred (step S222). If the predetermined time has not elapsed from the time when the communication abnormality occurred (NO in step S222), the electronic throttle 106 is controlled so that the throttle opening becomes equal to the target opening Ta1 (step S224). Then, if the predetermined time has elapsed from the time when the communication abnormality occurred (YES in step S222), the engine ECU 300 controls the electronic throttle 106 so that the throttle opening becomes equal to the target opening Ta1 (step S210).

After the throttle opening reaches the target opening Ta1, the engine ECU 300 keeps the throttle opening constant. Therefore, the output of the engine 10 is also held in a substantially constant state.

Figure 7:
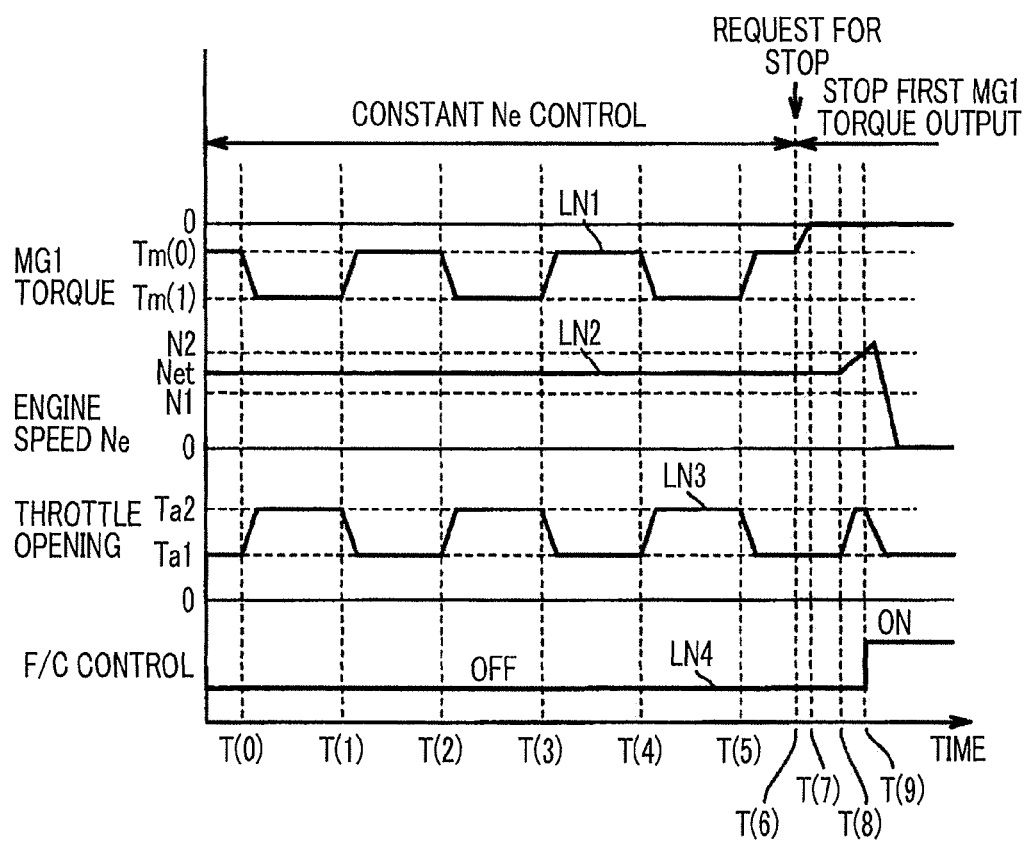
FIG. 7 is a timing chart useful for explaining operation of the HV-ECU and the engine ECU in the first embodiment.

If the engine speed Ne is within the predetermined range (YES in step S212), and the value indicating the duration T1 becomes larger than the threshold value A (YES in step S214) at time T(0), the electronic throttle 106 is controlled so that the throttle opening becomes equal to the target opening Ta2 (step S216), as indicated by line LN3 of FIG. 7. Therefore, the throttle opening increases from the target opening Ta1 to the target opening Ta2 as time proceeds. After the throttle opening reaches the target opening Ta2, the engine ECU 300 keeps the throttle opening constant. As the throttle opening increases from the target opening Ta1 to the target opening Ta2, the fuel injection amount also increases, resulting in increase of the output of the engine 10. Since the engine speed Ne is in a constant state, the engine torque increases. As a result, the magnitude of the output torque of the first MG 20 increases from Tm(0) to Tm(1) so as to keep the engine speed Ne at the target rotational speed Net, as indicated by line LN1 of FIG. 7.

If the engine speed Ne is within the predetermined range (YES in step S218), and the value indicating the duration T2 becomes larger than the threshold value B (YES in step S220), the control starts from step S200 again. In the case where there is a communication abnormality (YES in step S200), the control of the engine 10 is not being stopped (YES in step S202), and the predetermined time has elapsed (YES in step S222), the engine ECU 300 controls the electronic throttle 106 so that the throttle opening becomes equal to the target opening Ta1 again (step S210).

With the output variation control thus continued to be performed through the operation of steps S210-S220, the electronic throttle 106 is controlled so that the throttle opening is kept at the target opening Ta1, in a period from time T(1) to time T(2), as indicated by line LN3 of FIG. 7. Then, in a period from time T(2) to time T(3), the electronic throttle 106 is controlled so that the throttle opening is kept at the target opening Ta2.

Similarly, the output variation control is continued to be performed in a period from time T(3) to time T(5) and a period from time T(5) to time T(8). Therefore, in a period from time T(3) to time T(4), the electronic throttle 106 is controlled so that the throttle opening becomes equal to the target opening Ta1. In a period from time T(4) to time T(5), the electronic throttle 106 is controlled so that the throttle opening becomes equal to the target opening Ta2. In a period from time T(5) to time T(8), the electronic throttle 106 is controlled so that the throttle opening becomes equal to the target opening Ta1. After time T(8), the electronic throttle 106 is controlled so that the throttle opening becomes equal to the target opening Ta2.

If the HV-ECU 200 determines that there is a request for stop of the engine 10 (YES in step S110), such as when a condition for stopping the engine 10 is satisfied, during execution of the constant Ne control (S108), at time T(6), the HV-ECU 200 stops torque output of the first MG 20 (step S112), as indicated by line LN1 of FIG. 7. As a result, the output torque of the first MG 20 decreases with time, and becomes equal to zero at time T(7). If engine torque and friction torque of the engine 10 are balanced with each other, when the throttle opening is equal to the target opening Ta1, after the torque output of the first MG 20 is stopped, the engine speed Ne does not change.

As the throttle opening starts changing from the target opening Ta1 to the target opening Ta2, at time T(8), the output of the engine 10 increases, and the engine torque of the engine 10 increases. As a result, the engine torque exceeds the friction torque, and the engine speed Ne increases.

If the engine speed Ne exceeds the upper-limit value N2 of the predetermined range, and gets out of the predetermined range (NO in step S218), at time T(9), fuel-cut control is performed, as indicated by line LN4 of FIG. 7. As a result, the fuel-cut control is performed since the engine speed Ne falls outside the predetermined range (step S228), and the throttle-opening return control is performed (step S230).

As the fuel-cut control is performed, the output torque of the engine 10 becomes equal to zero, and therefore, the engine speed Ne is reduced with time. Then, each of the HV-ECU 200 and the engine ECU 300 determines that the engine 10 has been stopped (S116, S234), by determining that the engine speed Ne becomes equal to zero (YES in step S114, YES in step S232).

As described above, in the vehicle 1 according to this embodiment, the throttle opening is periodically varied, during operation of the engine 10 at the time of a communication abnormality, so that the output of the engine 10 can be periodically varied. At this time, the engine speed Ne is kept at the target rotational speed Net by the first MG 20, so that the engine torque can be varied. Therefore, after the torque output of the first motor-generator is stopped, the engine torque and the friction torque are less likely or unlikely to be kept in a balanced state. The varying engine torque becomes larger or smaller than the friction torque, so that the engine speed can be changed to be outside the predetermined range. As a result, the engine can be stopped with higher reliability. Accordingly, even in the case where two or more control units used for engine start-up cannot communicate with each other, the engine is allowed to operate, and the engine can be stopped with higher reliability when there is a request for stop of the engine.

Further, since the throttle opening is varied as the output variation control, for example, the engine torque of the engine 10 is kept generated, during execution of the output variation control. Therefore, electric power can be kept generated, and the traveling distance of the vehicle that travels in a limp-home mode is less likely or unlikely to be reduced.

A second embodiment will be described. In the above-described first embodiment, the case where the output of the engine 10 is periodically varied by periodically varying the throttle opening has been illustrated. In the second embodiment, the output of the engine 10 is periodically varied by periodically performing fuel-cut control during rotation of the engine 10, instead of control for varying the throttle opening.

In the above manner, the execution period and non-execution period of the fuel-cut control are repeated, so that the engine torque can be varied. Therefore, the engine torque and the friction torque are less likely or unlikely to be kept in a balanced state, after the torque output of the first MG 20 is stopped. When the engine torque falls below the friction torque during fuel-cut control, the engine speed Ne can be changed to be outside the predetermined range. As a result, the engine can be stopped with higher reliability.

The vehicle 1 according to this embodiment is different from the vehicle 1 according to the above-described first embodiment, in the processing content of the output variation control performed by the engine ECU 300. The other aspects of the configuration of the vehicle 1 according to this embodiment are identical with those of the configuration of the vehicle 1 according to the above-described first embodiment. The same reference numerals are assigned to corresponding constituent elements, which have the same functions. Accordingly, detailed description of these elements will not be repeated.

Figure 8:
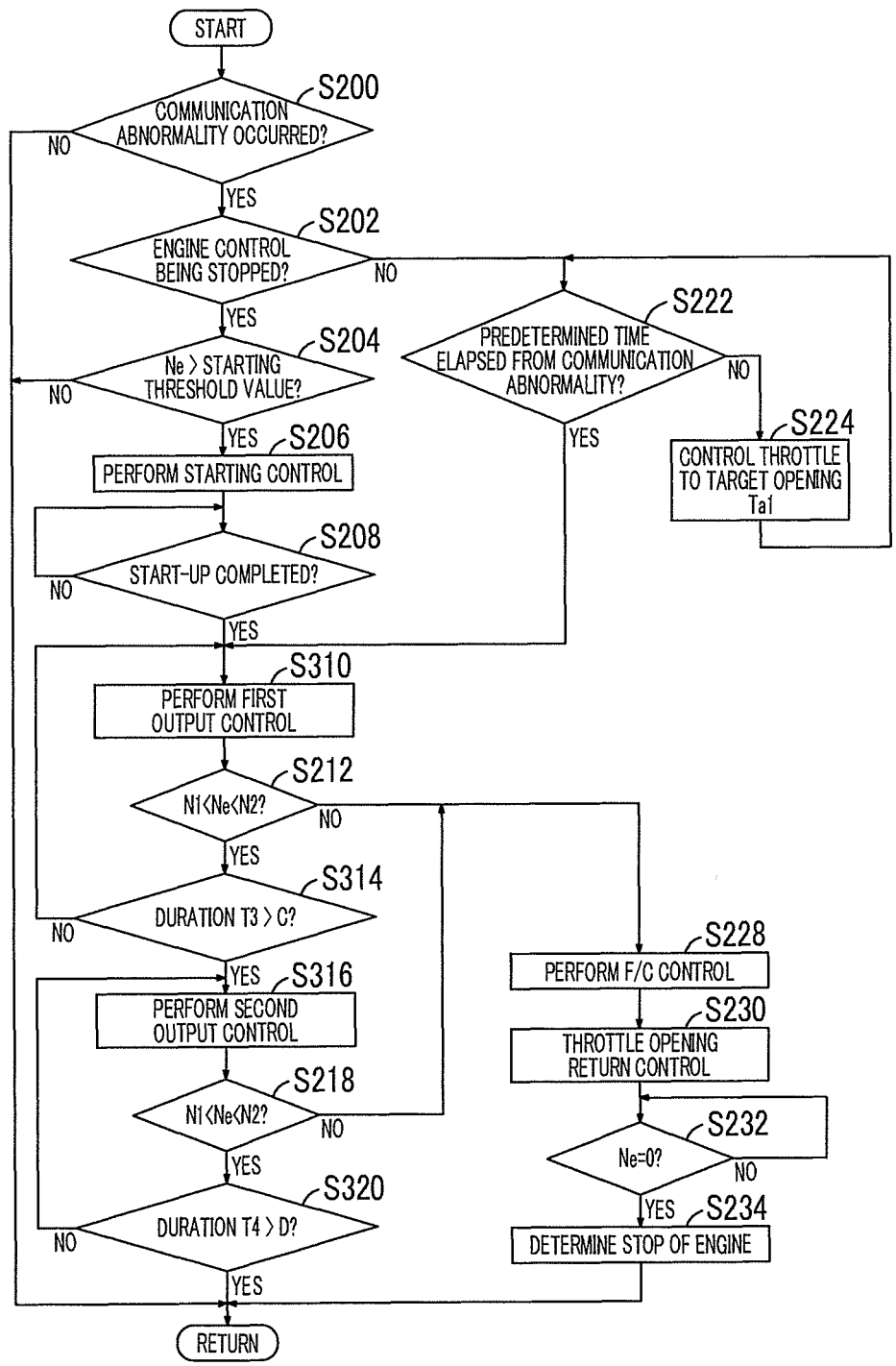
FIG. 8 is a flowchart illustrating a control routine of output variation control in a second embodiment.

Referring to FIG. 8, a control routine performed by the engine ECU 300 installed on the vehicle 1 according to this embodiment will be described.

The flowchart of FIG. 8 is different from the flowchart of FIG. 6 in that steps S310, S314, S316 and S320 are executed, in place of steps S210, S214, S216 and S220 of FIG. 6. Steps other than steps S310, S314, S316 and S320 of FIG. 8 are substantially identical with steps other than steps S210, S214, S216 and S220 of FIG. 6. Therefore, detailed description of these steps will not be repeated.

In step S310, the engine ECU 300 performs first output control. The first output control is to keep the output of the engine 10 at a predetermined output. The engine ECU 300 calculates required engine torque from the current engine speed Ne and the predetermined output. The engine ECU 300 determines parameters, such as the throttle opening and the fuel injection amount (fuel injection time), for controlling the engine 10, based on the calculated engine torque. The engine ECU 300 controls operation of the engine 10 according to the parameters thus determined. For example, the first output control may be control for making the throttle opening equal to the target opening Ta1.

If it is determined in step S212 that the engine speed Ne is within the predetermined range (YES in step S212), the engine ECU 300 determines in step S314 whether a value indicating a duration T3 is larger than a threshold value C. The duration T3 is an elapsed time from a point in time at which the first output control was started. For example, the threshold value C may be a predetermined value, or may be a value set according to conditions of the engine 10, etc. If it is determined that the value indicating the duration T3 is larger than the threshold value C (YES in step S314), the control proceeds to step S316.

In step S316, the engine ECU 300 performs second output control. The second output control is fuel-cut control. Namely, the engine ECU 300 controls the fuel injection devices 102 so as to stop fuel injection.

If it is determined in step S218 that the engine speed Ne is within the predetermined range (YES in step S218), the engine ECU 300 determines in step S320 whether a value indicating a duration T4 is larger than a threshold value D. The duration T4 is an elapsed time from a point in time at which the second output control was started. For example, the threshold value D may be a predetermined value, or may be a value set according to conditions of the engine 10, etc. If it is determined that the value indicating the duration T4 is larger than the threshold value D (YES in step S320), this control routine ends. The operation of steps S310, S314, S316 and S320 of FIG. 8 corresponds to the output variation control according to this embodiment.

If the value indicating the duration T3 is equal to or smaller than the threshold value C (NO in step S314), the engine ECU 300 returns to step S310. Also, if the value indicating the duration T4 is equal to or smaller than the threshold value D (NO in step S320), the engine ECU 300 returns to step S316.

The operation of the HV-ECU 200 and the engine ECU 300 of the vehicle 1 of this embodiment constructed as described above, based on the above flowchart, will be described with reference to FIG. 9.

For example, the case where the engine 10 is being stopped or at rest, and there is an abnormality in bidirectional communication between the HV-ECU 200 and the engine ECU 300 is assumed.

Figure 9:
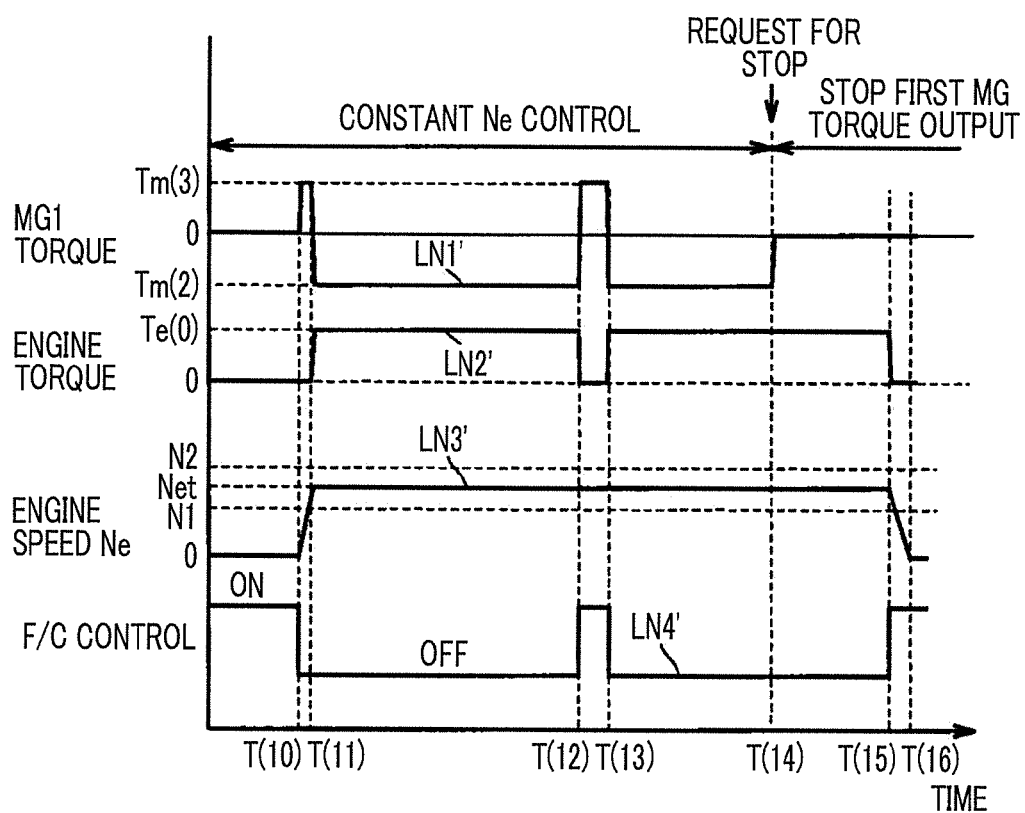
FIG. 9 is a timing chart useful for explaining operation of an HV-ECU and an engine ECU in the second embodiment.

Before time T(10), there is a communication abnormality (YES in step S100), and the engine speed Ne is equal to zero (YES in step S102), as indicated by line LN3' of FIG. 9. Also, the engine control is being stopped (YES in step S202). Therefore, the HV-ECU 200 determines whether there is a request for start of the engine 10 (step S104). The engine ECU 300 determines whether the engine speed Ne is larger than a starting threshold value Ne(0) (step S204).

If the HV-ECU 200 determines that there is a request for start of the engine 10 (YES in step S104), at time T(10), it performs cranking control using the first MG 20 (step S106), so as to increase the engine speed Ne. At this time, the output torque of the first MG 20 is increased to Tm(3) on the positive torque side.

If the engine speed Ne exceeds the starting threshold value Ne(0) (YES in step S204), starting control is performed (step S206). Then, if it is determined, at time T(11), that start-up of the engine 10 is completed (YES in step S208) since the engine speed Ne falls within the predetermined range, the first output control is performed (step S310).

As the engine speed Ne increases (NO in step S102), the HV-ECU 200 performs constant Ne control (S108). Therefore, the engine speed Ne is controlled to be equal to the target rotational speed Net.

With the first output control thus performed (step S310), the engine torque is kept at Te(0). Also, the output torque of the first MG 20 is kept at Tm(2) on the negative torque side. Then, if the value indicating the duration T3 exceeds the threshold value C (YES in step S314), at time T(12), while the engine speed Ne is within the predetermined range (YES in step S212), the fuel-cut control as the second output control is performed (step S316), as indicated by line LN4' of FIG. 9.

At this time, the fuel injection is stopped, and therefore, the engine torque becomes equal to zero, as indicated by line LN2' of FIG. 9. On the other hand, since the constant Ne control is performed, the output torque of the first MG 20 becomes equal to Tm(3) on the positive torque side, as indicated by line LN1' of FIG. 9, so that the engine speed Ne is kept at the target rotational speed Net.

If the duration T4 measured from the point in time at which the fuel-cut control was started becomes larger than the threshold value D (YES in step S320), at time T(13), while the engine speed Ne is held in the predetermined range (YES in step S218), the engine ECU 300 executes the routine again from step S200. Therefore, when there is a communication abnormality (YES in step S200), control of the engine 10 is not being stopped (NO in step S202), and the predetermined time has elapsed (YES in step S222), the engine ECU 300 performs the first output control (S310).

With the output variation control indicated by the operation of step S310, S314, S316 and S320 thus continued to be performed, the first output control is performed in a period from time T(13) to time T(15). Then, after time T(15), the second output control (fuel-cut control) is performed.

If the HV-ECU 200 determines at time T(14) that there is request for stop of the engine 10 (YES in step S110), as in the case where a condition for stopping the engine 10 is satisfied, during execution of the constant Ne control (step S108), the torque output of the first MG 20 is stopped (step S112). If the engine torque and the friction torque are balanced with each other when the first output control is performed, after the torque output of the first MG 20 is stopped, the engine speed Ne does not change.

At time T(15), the fuel-cut control is executed so that the engine torque becomes equal to zero; therefore, the engine speed Ne is reduced due to the effect of the friction torque of the engine 10.

If the engine speed Ne is reduced to be lower than the lower-limit value N1 of the predetermined range, and thus falls outside the predetermined range (NO in step S218), at time T(16), the fuel-cut control is continued (step S228), and the throttle opening return control is executed (step S230).

Then, each of the HV-ECU 200 and the engine ECU 300 determines that the engine speed Ne becomes equal to zero (YES in step S114, YES in step S232), thereby to determine that the engine 10 has been stopped (S116, S234).

As described above, in the vehicle 1 according to this embodiment, during rotation of the engine 10 at the time of a communication abnormality, the fuel-cut control is periodically performed, such that the execution period and non-execution period of the fuel-cut control are repeated; as a result, the engine torque can be varied. Therefore, after the torque output of the first MG 20 is stopped, the engine torque and the friction torque are less likely or unlikely to be kept in a balanced state. The engine torque is reduced to be smaller than the friction torque during fuel-cut control, so that the engine speed can be changed to be outside the predetermined range. As a result, the engine can be stopped with higher reliability. Accordingly, even when the two or more control units used for engine control cannot communicate with each other, the engine is allowed to operate, and the engine can be stopped with higher reliability when it is required to stop the engine.

Further, since a period in which the fuel injection is stopped under the fuel-cut control is set, the amount of fuel consumption is less likely or unlikely to be increased.

Some modified examples will be described. In the above-described embodiments, one example of the output variation control is to periodically vary the throttle opening, and another example of the output variation control is to periodically execute the fuel-cut control. However, the output variation control is not limited to these controls. For example, the output variation control may be implemented by periodically changing the ignition timing, or may be implemented by periodically increasing or reducing the advance amount of valve timing when a variable valve timing mechanism capable of changing the valve timing is installed on the engine 10.

Further, in the first embodiment as described above, when the throttle opening is periodically varied, the throttle opening is changed so that the engine torque exceeds the friction toque. However, the throttle opening may be changed so that the engine torque becomes smaller than the friction torque. Thus, when the torque output of the first MG 20 is stopped, the engine speed Ne is reduced to be outside the predetermined range, so that the engine can be stopped with higher reliability.

While the throttle opening is varied in two steps, in the first embodiment as described above, the throttle opening may be varied in three or more steps.

In the above embodiments, the equipments or devices installed on the vehicle 1 are controlled by the HV-ECU and the engine ECU. However, the hybrid vehicle of the embodiment is only required to have at least an ECU that controls the engine, and an ECU that determines whether the engine needs to be operated, and transmits a command signal to the ECU that controls the engine. For example, the vehicle 1 may have two or more ECUs into which the functions of the HV-ECU are further subdivided.

In the above-described embodiments, the transaxle 8 includes the first MG 20, second MG 30, and the power split device 40 that mechanically connects the first MG 20, second MG 30, and the engine 10, as shown in FIG. 1. However, the transaxle 8 is not particularly limited to the arrangement shown in FIG. 1, provided that it includes a first motor-generator connected to the engine 10, and a second motor-generator connected to at least the drive wheels 72.

Figure 10:
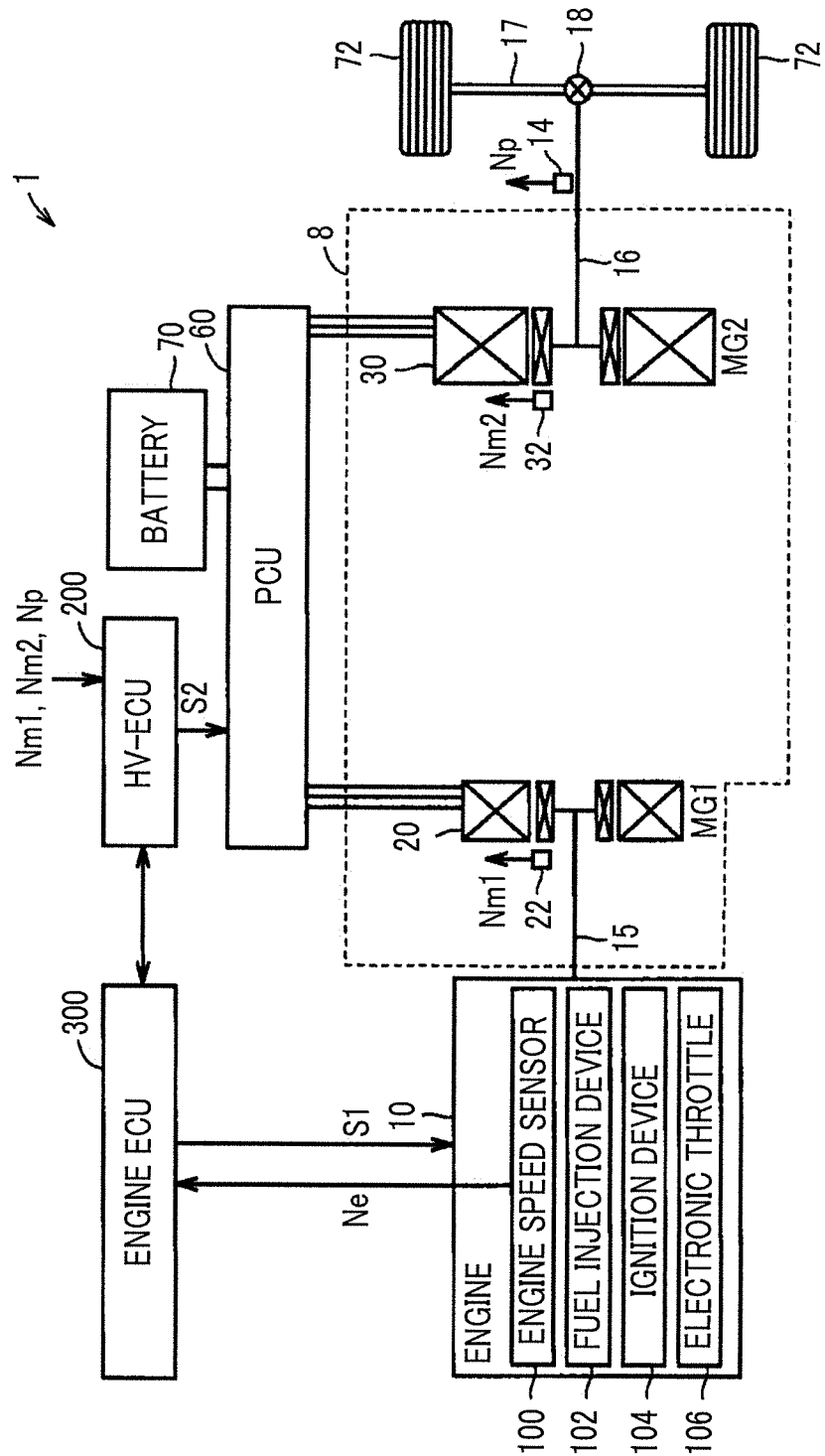
FIG. 10 is a schematic view showing the configuration of another example of a hybrid vehicle.

For example, the vehicle 1 may be a so-called series hybrid vehicle, in which the first MG 20 and the second MG 30 are not mechanically connected, as shown in FIG. 10. Namely, the transaxle 8 may be configured to include the first MG 20 connected to the crankshaft of the engine 10, and the second MG 30 connected to the axle. The configuration of the vehicle 1 other than the transaxle 8 shown in FIG. 10 is the same as that of the vehicle 1 shown in FIG. 1, and therefore, will not be repeatedly described in detail.

All or a part of the above-described modified examples may be combined and implemented. It is to be understood that the embodiments disclosed herein are merely exemplary and not restrictive in all respects. The scope of the invention is defined by the appended claims, rather than the above description of the embodiments, and is intended to include all changes within the meaning and scope equivalent to those of the claims.

What is claimed is:
1. A hybrid vehicle comprising:
an engine;
a first motor-generator connected to the engine;
a second motor-generator coupled to an axle;
a first electronic control unit configured to control the engine; and
a second electronic control unit configured to control the first motor-generator and the second motor-generator, the second electronic control unit being configured to transmit a command signal regarding activation or stop of the engine, to the first electronic control unit,
the first electronic control unit being configured to stop the engine, when an engine speed is outside a predetermined range, during operation of the engine at a time of a communication abnormality, the communication abnormality being a failure to communicate between the first electronic control unit and the second electronic control unit,
the second electronic control unit being configured to operate the first motor-generator such that the engine speed is within the predetermined range, during operation of the engine at the time of the communication abnormality, the second electronic control unit is configured to stop torque output of the first motor-generator, when the engine is to be stopped at the time of the communication abnormality, and the first electronic control unit being configured to control the engine such that an output of the engine periodically varies, during operation of the engine at the time of the communication abnormality.

2. The hybrid vehicle according to claim 1, wherein the first electronic control unit is configured to control the engine by periodically varying a throttle opening of the engine, at the time of the communication abnormality, such that the output of the engine is periodically varied.

3. The hybrid vehicle according to claim 1, wherein the first electronic control unit is configured to control the engine by periodically executing fuel-cut control while the engine is rotating, at the time of the communication abnormality, such that the output of the engine is periodically varied.

4. The hybrid vehicle according to claim 1, further comprising a planetary gear mechanism configured to mechanically couple the engine, the first motor-generator, and the second motor-generator.

* * * * *

UNITED STATES PATENT AND TRADEMARK OFFICE
CERTIFICATE OF CORRECTION

PATENT NO. : 9,944,270 B2
APPLICATION NO. : 15/428728
DATED : April 17, 2018
INVENTOR(S) : Hidekazu Nawata, Makoto Yamazaki and Yoshikazu Asami It is certified that error appears in the above-identified patent and that said Letters Patent is hereby corrected as shown below:

In the Specification

In Column 8, Line 23, after "predetermined value" delete "a" and insert --$\alpha$--, therefor.

In Column 8, Line 31, after "predetermined value" delete "a" and insert --$\alpha$--, therefor.

Signed and Sealed this
Twenty-ninth Day of May, 2018

Andrei Iancu
*Director of the United States Patent and Trademark Office*